(12) United States Patent
Tanabe et al.

(10) Patent No.: US 10,776,649 B2
(45) Date of Patent: Sep. 15, 2020

(54) METHOD AND APPARATUS FOR MONITORING REGION AROUND VEHICLE

(71) Applicants: DENSO CORPORATION, Kariya, Aichi-pref. (JP); TOYOTA JIDOSHA KABUSHIKI KAISHA, Toyota-shi, Aichi-ken (JP)

(72) Inventors: Ken Tanabe, Kariya (JP); Hiroaki Ito, Toyota (JP); Naohide Uchida, Numazu (JP)

(73) Assignees: DENSO CORPORATION, Kariya, Aichi-Pref. (JP); TOYOTA JIDOSHA KABUSHIKI KAISHA, Toyota-Shi, Aichi-Ken (JP)

( * ) Notice: Subject to any disclaimer, the term of this patent is extended or adjusted under 35 U.S.C. 154(b) by 147 days.

(21) Appl. No.: 16/142,462

(22) Filed: Sep. 26, 2018

(65) Prior Publication Data

US 2019/0102642 A1 Apr. 4, 2019

(30) Foreign Application Priority Data

Sep. 29, 2017 (JP) ................................. 2017-192068

(51) Int. Cl.
*G06K 9/00* (2006.01)
*G06K 9/20* (2006.01)
(Continued)

(52) U.S. Cl.
CPC ....... *G06K 9/2054* (2013.01); *G06K 9/00791* (2013.01); *G06K 9/6202* (2013.01);
(Continued)

(58) Field of Classification Search
CPC . G06T 2207/30261; G06T 2207/20021; G06T 2207/20012; G06T 2207/30252; G06T 2207/10028; G06T 2207/10012; G06T 7/285; G06T 7/223; G06T 7/11; G06T 7/248; G06T 7/593; G06K 9/2054;
(Continued)

(56) References Cited

U.S. PATENT DOCUMENTS

2010/0245578 A1* 9/2010 Kakinami .......... G06K 9/00805
348/148
2013/0129253 A1* 5/2013 Moate ..................... G01S 13/90
382/278
(Continued)

FOREIGN PATENT DOCUMENTS

JP 2016-081108 A 5/2016
JP 2016081108 * 5/2016 ............... G06T 7/20

*Primary Examiner* — Amara Abdi
(74) *Attorney, Agent, or Firm* — Maschoff Brennan

(57) ABSTRACT

In a monitoring apparatus, an optical flow calculator calculates an optical flow for each of selected pixel regions included in at least one pixel region group of an image. The optical flow for each of the selected pixel regions includes information about a direction and amount of movement of a corresponding part of the at least one target object. An adjuster calculates the sum of areas of all the pixel regions included in the at least one pixel region group of the image, and adjusts a selected number of the optical flows to be matched with the at least one pixel region group as a function of the calculated sum of the areas of all the pixel regions included in the at least one pixel region group.

9 Claims, 4 Drawing Sheets

(51) Int. Cl.
| | |
|---|---|
| G06T 7/11 | (2017.01) |
| G06T 7/246 | (2017.01) |
| G06K 9/62 | (2006.01) |
| G08G 1/04 | (2006.01) |
| G06T 7/593 | (2017.01) |
| H04N 13/239 | (2018.01) |
| G06T 7/285 | (2017.01) |
| H04N 13/296 | (2018.01) |
| G06T 7/223 | (2017.01) |
| G08G 1/16 | (2006.01) |
| H04N 5/247 | (2006.01) |
| B60R 1/00 | (2006.01) |
| H04N 13/00 | (2018.01) |

(52) U.S. Cl.
CPC ............... *G06T 7/11* (2017.01); *G06T 7/223* (2017.01); *G06T 7/248* (2017.01); *G06T 7/285* (2017.01); *G06T 7/593* (2017.01); *G08G 1/04* (2013.01); *G08G 1/166* (2013.01); *H04N 13/239* (2018.05); *H04N 13/296* (2018.05); *B60R 1/00* (2013.01); *B60R 2300/107* (2013.01); *B60R 2300/303* (2013.01); *G06K 2009/6213* (2013.01); *G06T 2207/10012* (2013.01); *G06T 2207/10028* (2013.01); *G06T 2207/20012* (2013.01); *G06T 2207/20021* (2013.01); *G06T 2207/30252* (2013.01); *G06T 2207/30261* (2013.01); *H04N 5/247* (2013.01); *H04N 2013/0081* (2013.01)

(58) Field of Classification Search
CPC ............. G06K 9/6202; G06K 9/00791; G06K 9/3233; G06K 9/008; G06K 2009/6213; B60R 2300/303; B60R 2300/107; B60R 1/00; H04N 13/239; H04N 13/296; H04N 2013/0081; H04N 5/247; G08G 1/166; G08G 1/04
See application file for complete search history.

(56) References Cited

U.S. PATENT DOCUMENTS

| | | | |
|---|---|---|---|
| 2017/0255839 A1* | 9/2017 | Han | G06K 9/3258 |
| 2019/0058823 A1* | 2/2019 | Dewhurst | H04N 5/2355 |

* cited by examiner

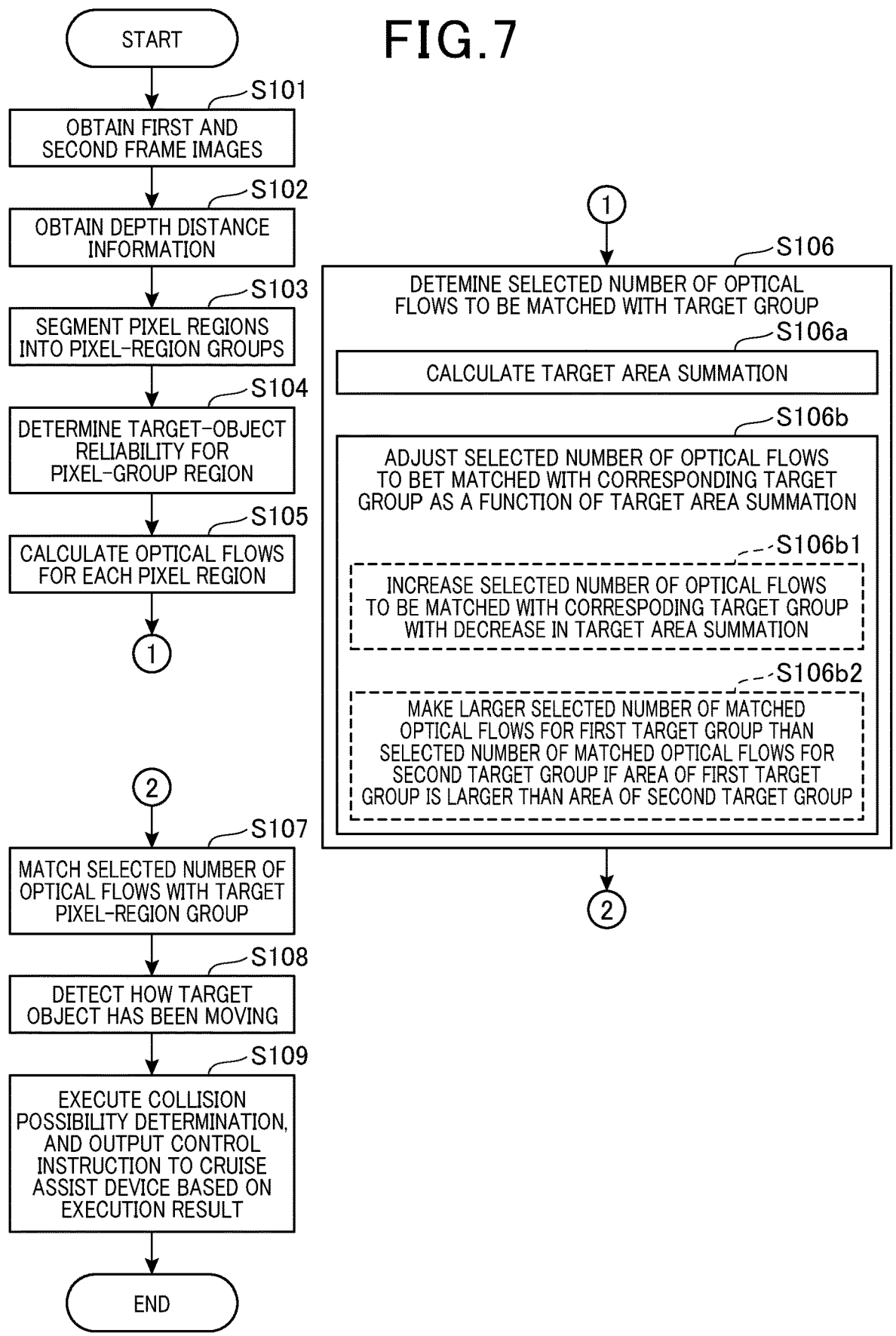

METHOD AND APPARATUS FOR MONITORING REGION AROUND VEHICLE

CROSS REFERENCE TO RELATED APPLICATION

This application is based on and claims the benefit of priority from Japanese Patent Application No. 2017-192068 filed on Sep. 29, 2017, the disclosure of which is incorporated in its entirety herein by reference.

TECHNICAL FIELD

The present disclosure relates to methods and apparatuses for monitoring a region around a vehicle.

BACKGROUND

There is known a technology that performs stereo-matching for a plurality of images of a target object captured around a vehicle; this technology enables a disparity between matched correspondence points of respective right and left images for each point of the target object to be generated, thus calculating, based on the disparity for each point of the target object, a depth distance of each point of the target object relative to the vehicle.

For example, Japanese Patent Application Publication No. 2016-81108, which will be referred to as a published patent document, discloses an object detection apparatus.

The object detection apparatus disclosed in the published patent document includes a grouping unit, an optical flow obtaining unit, a matching unit, and an object detector.

The grouping unit divides pixel regions constituting an image captured around a vehicle into plural pixel-region groups in accordance with depth distance information about each pixel region.

The optical flow obtaining unit obtains optical flows for each of target object.

The matching unit matches each of the optical flows with a corresponding one of the pixel-region groups in accordance with a positional relationship between the corresponding one of the optical flows and the corresponding one of the pixel-region groups. Each optical flow matched with a corresponding one of the pixel-region groups will be referred to as a matched optical flow.

The object detector detects how the at least one target object been moving in accordance with the matched optical flows.

The larger the number of optical flows for a target object matched with a corresponding pixel-region group is, the more the accuracy of detecting how the target object has been moving is improved. An increase in the number of optical flows matched a corresponding pixel-region group however causes the processing load of the matching unit to increase.

From this viewpoint, the matching unit disclosed in the published patent document is configured to make smaller the number of optical flows for a target object to be matched with per unit area of each of selected pixel-region group that have a smaller average depth distance.

That is, the published patent document describes that a decrease in each of the selected pixel-region groups that have a smaller average depth distance may not contribute greatly to reduction of the detection accuracy of how the target object for each of the selected pixel-region groups has been moving.

The published patent document therefore describes that, for this reason, it is possible to achieve both maintenance of the detection accuracy of the target objects being high, and reduction in the processing load of the matching unit.

SUMMARY

Making smaller the number of optical flows for a target object to be matched with unit area of each of selected pixel-region group that have a smaller average depth distance may unfortunately result in a reduction in the detection accuracy of the target object for each of the selected pixel-region groups.

This may be because the reduced number of optical flows matched with each of the selected pixel-region groups may increase effects of errors contained in the reduced optical flows, resulting in a reduction in the detection accuracy of the target object for each of the selected pixel-region groups.

From this viewpoint, the present disclosure seeks to provide monitoring technologies, each of which is capable of addressing the issue set forth above. Specifically, the present disclosure seeks to provide such monitoring technologies, each of which is capable of achieving both (1) Prevention of reduction in the detection accuracy of a target object (2) Prevention of an increase of the processing load of a matching unit According to a first exemplary aspect of the present disclosure, there is provided an apparatus for monitoring a region around a vehicle based on an image captured around the vehicle. The image is comprised of a plurality of pixel regions. The apparatus includes a distance information item obtainer configured to obtain, for each of the pixel regions of the image, a distance information item relative to the vehicle in accordance with the image. The apparatus includes a grouping processor configured to segment the pixel regions of the image into at least one pixel region group, the at least one pixel region group including at least one target object. The apparatus includes an optical flow calculator configured to calculate an optical flow for each of selected pixel regions included in the at least one pixel region group of the image. The optical flow for each of the selected pixel regions includes information about a direction and amount of movement of a corresponding part of the at least one target object. The apparatus includes an adjuster configured to calculate the sum of areas of all the pixel regions included in the at least one pixel region group of the image, and adjust a selected number of the optical flows to be matched with the at least one pixel region group as a function of the calculated sum of the areas of all the pixel regions included in the at least one pixel region group. The apparatus includes a movement state detector configured to detect how the at least one target object has been moving based on the selected number of the optical flows matched with the at least one pixel region group.

According to a second exemplary aspect of the present disclosure, there is provided a method of monitoring a region around a vehicle based on an image captured around the vehicle. The image is comprised of a plurality of pixel regions. The method includes obtaining, for each of the pixel regions of the image, a distance information item relative to the vehicle in accordance with the image, and segmenting the pixel regions of the image into at least one pixel region group, the at least one pixel region group including at least one target object. The method includes calculating an optical flow for each of selected pixel regions included in the at least one pixel region group of the image. The optical flow for each of the selected pixel regions includes information about a direction and amount of movement of a corresponding part of the at least one target object. The method includes calculating the sum of areas of all the pixel regions included in the at least one pixel region group of the image, and adjusting a selected number of the optical flows to be matched with the at least one pixel region group as a function of the calculated sum of the areas of all the pixel regions included in the at least one pixel region group. The method includes detecting how the at least one target object has been moving based on the selected number of the optical flows matched with the at least one pixel region group.

According to a third exemplary aspect of the present disclosure, there is provided an apparatus for monitoring a region around a vehicle based on an image captured around the vehicle. The image is comprised of a plurality of pixel regions. The apparatus includes a processor, a non-transitory computer readable storage medium, and a set of computer-executable instructions stored on the computer-readable storage medium that cause the processor to implement (1) Obtaining, for each of the pixel regions of the image, a distance information item relative to the vehicle in accordance with the image (2) Segmenting the pixel regions of the image into at least one pixel region group, the at least one pixel region group including at least one target object (3) Calculating an optical flow for each of selected pixel regions included in the at least one pixel region group of the image, the optical flow for each of the selected pixel regions including information about a direction and amount of movement of a corresponding part of the at least one target object (4) Calculating the sum of areas of all the pixel regions included in the at least one pixel region group of the image;

(5) Adjusting a selected number of the optical flows to be matched with the at least one pixel region group as a function of a decrease in the calculated sum of the areas of all the pixel regions included in the at least one pixel region group (6) Detecting how the at least one target object has been moving based on the selected number of the optical flows matched with the at least one pixel region group Each of the matched number determiner, the matched number determining step, or the processor according to the first, second, and third exemplary aspects calculates the sum of areas of all the pixel regions included in the at least one pixel region group of the image.

Then, each of the matched number determiner, the matched number determining step, or the processor adjusts the selected number of the optical flows to be matched with the at least one pixel region group as a function of the calculated sum of the areas of all the pixel regions included in the at least one pixel region group.

The processing load of the matching unit, the matching step, or the processor, which are needed to match the optical flows included in the at least one pixel region group with the at least one pixel region group, depends on the sum of the areas of all the pixel regions included in the at least one pixel region group.

That is, adjusting the selected number of the optical flows to he matched with the at least one pixel region group as a function of the calculated sum of the areas of all the pixel regions included in the at least one pixel region group enables optical flows to be matched with the corresponding at least one target pixel-region group as much as possible while preventing an increase of the total processing load of the matching unit, matching step, or the processor.

BRIEF DESCRIPTION OF THE DRAWINGS

Other aspects of the present disclosure will become apparent from the following description of embodiments with reference to the accompanying drawings in which:

FIG. 7 is a flowchart schematically illustrating a target object detection routine carried out by an ECU illustrated in FIG. 1.

DETAILED DESCRIPTION OF EMBODIMENT

The following describes a present embodiment of the present disclosure with reference to the accompanying drawings. The present disclosure is not limited to the following present embodiment, and can be modified.

The following describes an example of the structure of a surround view monitoring apparatus 10 according to the present embodiment of the present disclosure with reference to FIGS. 1 to 7.

Figure 1:
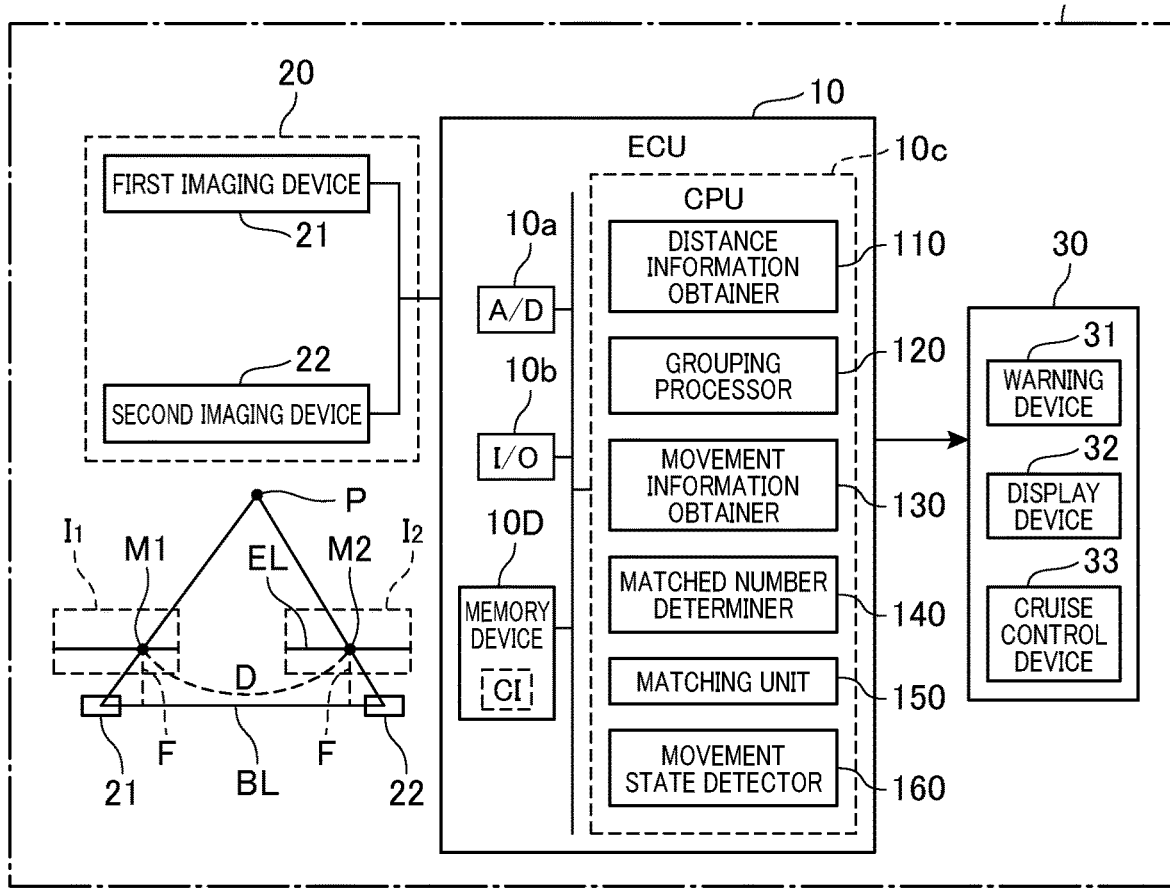
FIG. 1 is a block diagram schematically illustrating an example of the overall structure of a surround view monitoring apparatus according to a present embodiment of the present disclosure.

Referring to FIG. 1, the surround view monitoring apparatus 10 functionally includes a distance information obtainer 110, a grouping processor 120, a movement information obtainer 130, a matched number determiner 140, a matching unit 150, and a movement state detector 160. For example, the surround view monitoring apparatus 10 is comprised of, for example, an electronic control unit (ECU) including, for example, an A/D converter 10$a$, an input/output (I/O) interface 10$b$, a CPU 10$c$, and a memory device 10$d$ including, for example, at least one of semiconductor memories, such as a RAM and a ROM, and an image memory; these components 10$a$ to 10$d$ are communicably connected to each other. Each of the semiconductor memories is an example of a non-transitory computer readable storage medium.

For example, a microcontroller or a microcomputer in which functions of a computer system have been collectively installed embodies the surround view monitoring apparatus 10. For example, the CPU 10$c$ of the surround view monitoring apparatus 10 executes the set of computer-executable instructions of at least one program stored in the memory device 10$d$, thus implementing the functional modules 110 to 160. Similarly, the functional modules 110 to 160 can be implemented by at least one hardware unit and/or at least one software and hardware hybrid circuit. A plurality of microcontrollers or microcomputers can embody the surround view monitoring apparatus 10. The surround view monitoring apparatus 10 can include a field-programmable gate array (FPGA) in addition to or in place of the CPU 10c. The FPGA or the combination of the FPGA and the CPU 10c can s implement the functional modules 110 to 160. The memory device 10d serves as a storage in which the at least one program is stored, and also serves as a working memory in which the CPU 10c performs various tasks.

The surround view monitoring apparatus 10 is communicably connected to a distance image sensor apparatus 20 and cruise assist devices 30 installed in a vehicle V.

For example, the surround view monitoring apparatus 10 can also be installed in the vehicle V, or can be separately arranged from the vehicle V.

The distance image sensor apparatus 20 is configured to capture an image, i.e. a surround-view image, of at least part of a region around the vehicle V, and the surround view monitoring apparatus 10 is configured to detect, based on the image captured by the distance image sensor apparatus 20, a target scene around the vehicle V.

For example, the distance image sensor apparatus 20 includes a stereo camera comprised of first and second imaging devices 21 and 22. The first and second imaging devices 21 and 22 are aligned such that the alignment direction of the first and second imaging devices 21 and 22 crosses an optical axis of each of the first and second imaging devices 21 and 22. This arrangement of the first and second imaging devices 21 and 22 enables the first and second imaging devices 21 and 22 to capture different surround-view images of a common target scene around the vehicle V from the respective different positions in the vehicle V.

For example, the first and second imaging devices 21 and 22 are located close to the rearview mirror of the vehicle V while maintaining (1) The optical axis of the first imaging device 21 and the optical axis of the second imaging device 22 have the same height and are perpendicular to the width direction of the vehicle V (2) The minimum distance, i.e. interval, between the optical axis of the first imaging device 21 and the optical axis of the second imaging device 22 along the width direction of the vehicle is set to a predetermined length This arrangement of the first and second imaging devices 21 and 22 enables the first and second imaging devices 21 and 22 to capture front-view images of a common target scene in front of the vehicle V from the respective different positions in the vehicle V.

The length of the minimum distance between the optical axis of the first imaging device 21 and the optical axis of the second imaging device 22 is identical to a predetermined length of a baseline (see BL in FIG. 1) between the center of the optical lens of the first imaging device 21 and the center of the optical lens of the second imaging device 22.

Each of the first and second imaging devices 21 and 22 includes an optical lens with a predetermined focal length F (see FIG. 1), and an image sensor, such as a charge-coupled device (CCD) image sensor, a complementary metal oxide semiconductor (CMOS) image sensor, or an infrared camera. The image sensor is comprised of light-sensitive elements; the light-sensitive elements serve as pixels and are arranged in a two-dimensional array. That is, the array of the pixels is configured as a predetermined number of vertical columns by a predetermined number of horizontal rows. The two-dimensionally arranged pixels constitute an imaging area, i.e. a light receiving area.

Each of the first and second imaging devices 21 and 22 is configured to periodically perform a capturing task that causes the two-dimensionally arranged light sensitive elements to be exposed to light incident to the imaging area from a common target scene via the optical lens during a shutter time, i.e. an exposure time or at a shutter speed, so that each of the two-dimensionally arranged light-sensitive elements (pixels) receives a corresponding component of the incident light.

The two-dimensionally arranged light-sensitive elements of each of the first and second imaging devices 21 and 22 according to the present embodiment are comprised of plural pixel regions constitute a frame image captured by the corresponding one of the first and second imaging devices 21 and 22. The shutter time of the first imaging device 21 is synchronized with the shutter time of the second imaging device 22, so that the frame image captured by the first imaging device 21 is synchronized with the frame image captured by the second imaging device 22.

Each of the pixel regions for each of the first and second imaging devices 21 and 22, which constitute a corresponding one of the frame images, can consist of a single pixel or plural pixels. Each of the pixel regions for the first and second imaging devices 21 and 22, which constitute a corresponding one of the frame images, can consist of at least the array of at least two pixels in the vertical column direction of the imaging area and at least two pixels in the horizontal row of the direction of the imaging area, which can be represented as (2×2). In other words, each of the pixel regions has the matrix size of equal to or larger than the matrix size (2×2).

Each of the pixel regions for each of the first and second imaging devices 21 and 22 converts the intensity or luminance level of the light component received on the corresponding pixel region into luminance information item indicative of an analog pixel value or an analog pixel signal, that is associated with the luminance level of the received light component. That is, the luminance information items about all the pixel regions constitute a corresponding frame image.

For example, if each of the pixel regions consists of a single pixel, the luminance level of the pixel represents the luminance information item about the corresponding pixel region. If each of the pixel regions consists of plural pixels, the average value, the maximum value, the minimum value, or a predetermined representative value of the luminance levels of the plural pixels can be determined as the luminance information item about the corresponding one of the pixel regions.

That is, the first and second imaging devices 21 and 22 are configured to periodically output a pair of frame images to the ECU 10 each time they periodically generate the frame images. The A/D converter 10a of the ECU 10 converts the pair of frame images each comprised of the luminance information items into a pair of digital frame images, i.e. a pair of frame image data items, each comprised of digital luminance information items respectively corresponding to the luminance information items about the corresponding one of the pair of frame images.

Note that, because the distance image sensor apparatus 20 is configured as the stereo camera, any point in the target scene in the pair of frame images captured by the respective first and second imaging devices 21 and 22 will be projected to a pair of matched pixel regions in the respective first and second frame images.

That is, the frame image (see reference character I1 as an example) captured by the first imaging device 21 includes (1) The luminance information item about each of the pixel regions that constitute the frame image I1

(2) A depth distance information item (see reference character DI as an example) about each point (see reference character P as an example) of the target scene for the corresponding matched pixel region (see reference character M1 as an example) in the first frame image Specifically, the depth distance information item about each point of the target scene is expressed as a function of a disparity (see reference character D as an example) of the corresponding matched pixel region M1 in the first frame image relative to the corresponding matched pixel region (see reference character M2 as an example) in the frame image (see reference character I2 as an example) captured by the second imaging device 22. More specifically, the depth distance information item about each point of the target scene is expressed as a function of the disparity D, the focal length F of the corresponding optical lens, and the length of the baseline BL.

Similarly, the frame image I2 captured by the second imaging device 22 includes (1) The luminance information item about each of the pixel regions that constitute the second frame image I2

(2) The depth distance information item DI about each point P of the target scene for the corresponding matched pixel region M2 in the frame image I2

Specifically, the depth distance information item about each point of the target scene is expressed as a function of the disparity D of the corresponding matched pixel region M2 in the frame image I2 relative to the corresponding matched pixel region M1 in the frame image I1. More specifically, the depth distance information item about each point of the target scene is expressed as a function of the disparity D, the focal length F of the corresponding optical lens, and the length of the baseline BL.

As another example, the distance image sensor apparatus 20 can include a known time-to-flight (TOF) camera, which includes such an image sensor, for measuring (1) The luminance information item about each of the pixel regions that constitute a frame image captured by the image sensor (2) A depth distance information item about each point of the target scene relative to the corresponding pixel region on the frame image As a further example, the distance image sensor apparatus 20 can include (1) Such an image sensor for measuring, as the luminance information item, the luminance level of a received light component for each of the pixel regions that constitute a frame image captured by the image sensor (2) A known distance sensor, such as a laser sensor, for transmitting laser waves and measuring a depth distance information item about each point of the target scene relative to the corresponding pixel region on the frame image Each of the frame images captured by the distance image sensor apparatus 20 can be a monochrome image or a color image. The distance image sensor apparatus 20 can use any wavelength band for capturing frame images, such as a visible wavelength band or a near-infrared band, as long as the used wavelength band enable scenes around the vehicle V to be recognizable.

The distance information obtainer 110 performs an obtaining task that (1) Receives the pair of frame images captured by the respective first and second imaging devices 21 and 22 of the distance image sensor apparatus 20

(2) Obtain, for each pixel region of, for example, a selected one of the pair of frame images, the corresponding depth distance information item.

Specifically, the distance information obtainer 110 obtains, from a selected one of the frame images, the luminance information item and the depth distance information item for each of the pixel regions of the selected one of the frame images each time the distance information obtainer 110 receives the pair of frame images periodically sent from the respective first and second imaging devices 21 and 22. Then, the distance information obtainer 110 stores, in the memory device 10d, the obtained luminance information item and the depth distance information for each of the pixel regions of the selected one of the pair of frame images.

Note that, as illustrated in FIG. 1, the depth distance information about each point of the target scene represents information about the depth distance of the corresponding point of the target scene relative to the distance image sensor apparatus 20. Specifically, as illustrated in FIG. 1, if the distance image sensor apparatus 20 is configured as the stereo camera comprised of the first and second imaging devices 21 and 22, the depth distance information about each point of the target scene represents information about the depth distance of the corresponding point of the target scene relative to the baseline (see BL in FIG. 1) between the first and second imaging devices 21 and 22, that is, between the he center of the optical lens of the first imaging device 21 and the center of the optical lens of the second imaging device 22.

The target scene can include, for example, at least one solid object and a background, such as the road surface on which the vehicle V is travelling or the sky above the at least one solid object.

For example, if each of the pixel regions of the frame image I1 consists of a single pixel, the depth distance about the corresponding matched pixel of the frame image represents the depth distance about the corresponding matched pixel region of the first frame image. If each of the pixel regions of the frame image I1 consists of plural pixels, the average value, the maximum value, the minimum value, or a predetermined representative value of the depth distances of the plural pixels represent the depth distance about the corresponding matched pixel region of the frame image I1. This can be similarly applied to the frame image I2.

Note that the depth distance of each point of the target scene for the corresponding matched pixel region in the frame image I1 can be used as the depth distance information item about the corresponding point of the target scene for the corresponding matched pixel region in the frame image I1. As another example, a parameter associated with the depth distance of each point of the target scene for the corresponding matched pixel region in the frame image I1 can be used as the depth distance information item about the corresponding point of the target scene for the corresponding matched pixel region in the frame image I1.

Specifically, for each point of the target scene, the disparity of the corresponding matched pixel region in the frame image I1 relative to the corresponding matched pixel region in the frame image I2 can be used as the depth distance information item about the corresponding point of the target scene for the corresponding matched pixel region in the frame image I1.

That is, as illustrated in FIG. 1, the disparity for each point of the target scene represents the minimum distance between the corresponding matched regions in the respective frame images I1 and I2. The shorter the depth distance of any point of the target scene is, the larger the value of the disparity between the corresponding matched regions in the respective frame images I1 and I2 is.

If the distance image sensor apparatus 20 is configured as the stereo camera comprised of the first and second imaging devices 21 and 22, the distance information obtainer 110 is configured to generate a disparity map, i.e. a disparity image, comprised of the disparities of all the pixel regions in a selected one of the frame images I1 and I2 as a base frame image. That is, the disparity image corresponding to the base frame image is comprised of the disparities of all the pixels thereof.

Then, the distance information obtainer 110 is configured to use the disparity of each pixel region in the disparity image as the depth distance information item about the corresponding point of the target scene. The distance information obtainer 110 can be configured to calculate a depth distance for each pixel region in the disparity image based on the disparity of the corresponding pixel region, and use the calculated depth distance for each pixel region as the depth distance information item for the corresponding pixel region.

For example, the distance information obtainer 110 can be configured to calculate a depth distance for each pixel region in the disparity image based on the disparity of the corresponding pixel region using a known dense stereo matching method, such as a known semi-global matching (SGM) method or a known efficient large-scale stereo matching (ELAS) method.

That is, the distance information obtainer 110 obtains the disparity and depth distance information item for each of the pixel regions in the base frame image.

The grouping processor 120 performs a grouping task that segments the pixel regions in the base frame image into plural pixel-region groups in accordance with the depth distance information items for the respective pixel regions.

For example, the grouping processor 120 segments pixel regions into the same pixel-region group upon determining that the pixel regions are three-dimensionally close to each other in accordance with their depth distance information items.

For example, the grouping processor 120 can group pixel regions into the same pixel-region group upon determining that (1) The depth distances of their pixel regions are substantially identical to each other or (2) The absolute difference between the depth distances of the respective pixel regions is maintained within a predetermined threshold distance.

In particular, the grouping processor 120 can group pixel regions into the same pixel-region group upon determining that the depth distances of their pixel regions are substantially identical to each other or the absolute difference between the depth distances of the respective pixel regions is maintained within a predetermined threshold distance in the base frame image along at least one the horizontal row direction and the vertical column direction.

Figure 2:
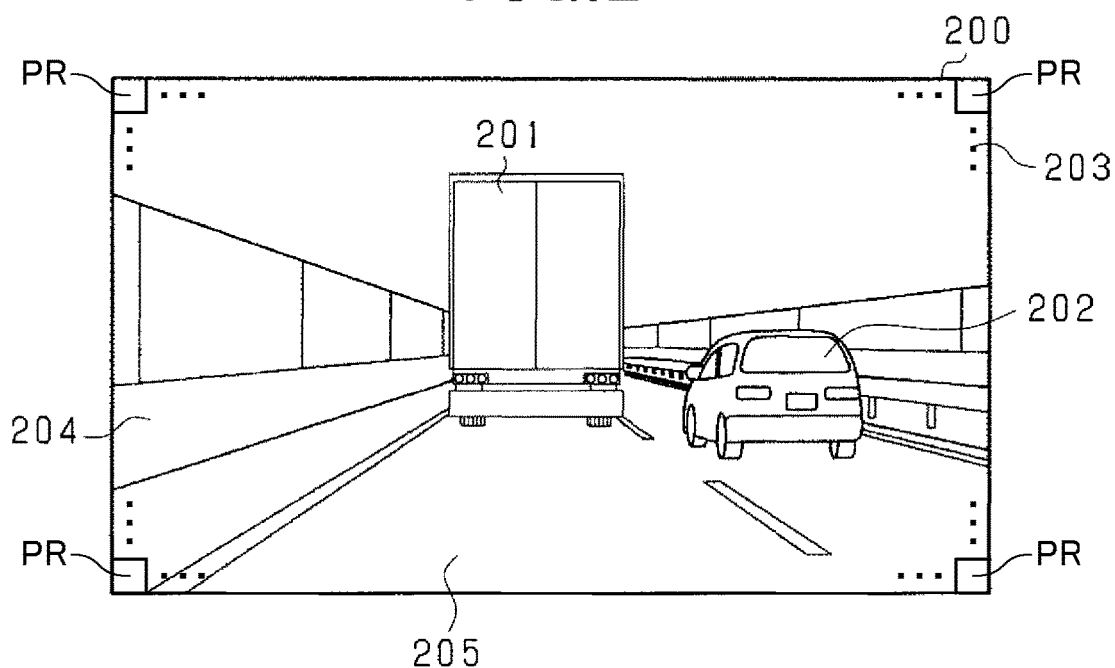
FIG. 2 is a view schematically illustrating a base frame image used by the surround view monitoring apparatus for monitoring surround views around a vehicle.

For example, FIG. 2 schematically illustrates a base frame image 200 comprised of pixel regions PR. In FIG. 2, a target scene imaged as the base frame image 200 includes vehicles 201 and 202, i.e. the rear surfaces of the vehicles 201 and 202, and guard rails 204 as solid objects, and also includes the sky 203 above the vehicles 201 and 202, and the road surface 205 on which the vehicle V is travelling as backgrounds.

At that time, the grouping processor 120 partitions the base frame image 200 into the pixel regions PR, and obtains, from each of the pixel regions PR, the corresponding luminance information item and the corresponding depth distance information item.

Then, the grouping processor 120 segments the pixel regions PR into five pixel-region groups 301 to 305 (see FIG. 3) in accordance with the depth distance information items of the pixel regions PR such that segmented pixel regions PR included in each of the pixel-region groups 301 to 305 are (1) Adjacent to each other in the vertical column direction of the base frame image 200

Figure 3:
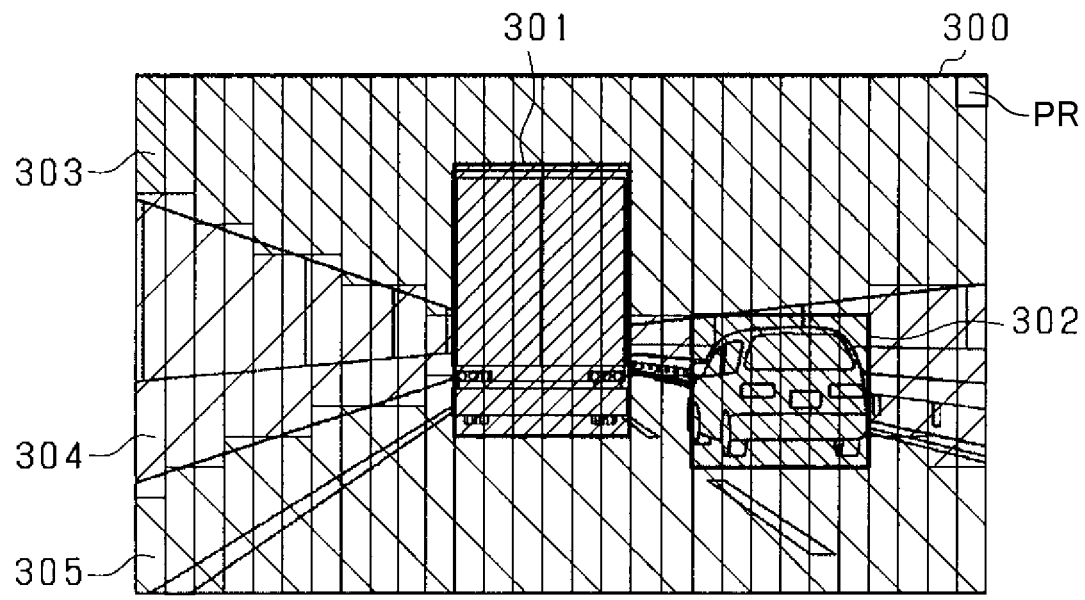
FIG. 3 is a view schematically illustrating a grouped base frame image used to describe an example of how a grouping processor illustrated in FIG. 1 segments selected pixel regions in the base frame image into pixel-region groups, some of which respectively include target objects.

(2) The depth distances of the segmented pixel regions PR in the vertical column direction are substantially identical to each other or the absolute differences between the depth distances of the segmented pixel regions PR are within a predetermined range (see FIG. 3)

That is, the base frame image 200 is converted into a grouped base frame image 300 comprised of the pixel-region groups 301 to 305.

For example, the pixel-region group 301 has a substantially rectangular shape in which relatively small depth distances identical or similar to each other are included, and the pixel-region group 302 also has a substantially rectangular shape in which relatively small depth distances identical or similar to each other are included.

The pixel-region group 303 is located above the pixel-region groups 301 and 302, and relatively large depth distances identical or similar to each other are included in the pixel-region group 303.

The pixel-region group 305 is located around the lower sides of the pixel-region groups 301 and 302, and the depth distances included in the pixel-region group 305 are reduced as the corresponding pixel regions are closer to the vehicle V.

The pixel-region group 304 is located between the pixel-region group 303 and the pixel-region group 305, and the depth distances included in the pixel-region group 304 is reduced as the corresponding pixel regions are closer to both ends of the base frame image in the horizontal row direction of the base frame image.

Next, the grouping processor 120 recognizes what is imaged in each of the pixel-region groups in accordance with the depth distance information items and the disparities of the respective pixel regions included in the corresponding one of the pixel-region group.

For example, in the pixel-region group 301, the depth distances of the respective pixel regions PR are relatively small, so that the disparities of the respective pixel regions PR in the pixel-region group 301 are relatively large. For this reason, the grouping processor 120 recognizes that a first target object, i.e. the vehicle 201, is imaged in the pixel-region group 301.

Similarly, in the pixel-region group 302, the depth distances of the respective pixel regions PR are relatively small, so that the disparities of the respective pixel regions PR in the pixel-region group 302 are relatively large. For this reason, the grouping processor 120 recognizes that a second target object, i.e. the vehicle 202, is imaged in the pixel-region group 302. That is the type of the first target object 201 is identical to the type of the second target object 202.

In contrast, in the pixel-region group 303, the depth distances of the respective pixel regions PR are relatively large, so that the disparities of the respective pixel regions PR of the pixel-region group 303 are relatively small. For this reason, the grouping processor 120 recognizes that a farther background relative to the target objects is imaged in the pixel-region group 303.

Additionally, in the pixel-region group 304, the depth distances of the respective pixel regions PR are reduced as the corresponding pixel regions PR are closer to both ends of the base frame image in the horizontal row direction of the base frame image. This results in the disparities of the respective pixel regions PR being increased as the corresponding pixel regions PR are closer to both ends of the base frame image in the horizontal row direction of the base frame image. For this reason, the grouping processor 120 recognizes that the guard rails 204 located at both shoulders of the road on which the vehicle V is travelling are imaged in the pixel-region group 304.

Similarly, in the pixel-region group 305, the depth distances of the respective pixel regions PR are reduced as the corresponding pixel regions PR are closer to the vehicle V. This results in the disparities of the respective pixel regions PR being increased as the corresponding pixel regions PR are closer to the vehicle V. For this reason, the grouping processor 120 recognizes that the road surface 205 located at the lower sides of the first and second target objects, i.e. vehicles, 201 and 202 is imaged in the pixel-region group 305.

The grouping processor 120 serves as a grouping storage unit to store the pixel-region groups, i.e. the pixel-region groups 301 to 305 in the memory device 10d.

As described above, the distance information obtainer 110 is configured to periodically obtain the pair of first and second frame images periodically captured by the first and second imaging devices 21 and 22, and periodically obtain, from a selected one of the first and second frame images as the base frame image, the depth distance information item and the luminance information item for each of the pixel regions. The grouping processor 120 is configured to periodically segment the pixel regions in the base frame image into pixel-region groups in accordance with the depth distance information items for the respective pixel regions.

That is, the ECU 10 periodically performs the obtaining task and the grouping task set forth above to thereby (1) Obtain, from a selected one of the first and second frame images as the base frame image, the depth distance information item and the luminance information item for each of the pixel regions (2) Segment the pixel regions in the base frame image into pixel-region groups in accordance with the depth distance information items for the respective pixel regions to thereby store the pixel-region groups in the memory device 10d.

That is, for each execution period of the obtaining task and the grouping task, the pixel-region groups are stored in the memory device 10d. The pixel-region groups stored for each execution period enable the ECU 10 to detect movement of an object included in at least one of the pixel-region groups.

The movement information obtainer 130 calculates, between a current base frame image and an immediately previous frame image successively obtained by the ECU 10, an optical flow for each of the pixel regions; the optical flow includes the direction and amount of movement of a corresponding part of the target object from the immediately previous frame image to the current base frame image. For example, the movement information obtainer 130 calculates the optical flow for each of the pixel regions in the current base frame image relative to the corresponding one of the pixel regions in the immediately previous frame image as a movement information item of the corresponding part of the target object.

For example, the optical flow is a movement vector of each pixel region, and therefore the optical flow for each pixel region represents movement of a corresponding part of the target object between the current base frame image and the immediately previous frame image. For this reason, the optical flow for each pixel region between the current base frame image and the immediately previous frame image includes information about the direction and amount of movement of the corresponding part of the target object in the corresponding pixel region between the current base frame image and the immediately previous frame image.

As described above, each of the pixel regions can consist of a single pixel or plural pixels. If each of the pixel regions consists of plural pixels, the average value, the maximum value, the minimum value, or a predetermined representative value of the optical flows in the plural pixels can be determined as an optical flow in the corresponding one of the pixel regions.

The size of each pixel region used by the movement information obtainer 130 for calculating the corresponding optical flow is set to be identical to the size of the corresponding pixel region used by the distance information obtainer 110 for obtaining the corresponding depth distance information item. The size of each pixel region used by the movement information obtainer 130 for calculating the corresponding optical flow can be set to be different from the size of the corresponding pixel region used by the distance information obtainer 110 for obtaining the corresponding depth distance information item.

Specifically, the movement information obtainer 130 analyzes how each pixel region in the immediately previous base frame image has moved to any location in the current base frame image using, for example, a matching method or a gradient method to thereby calculate the optical flow for each of the pixel regions. Note that the movement information obtainer 130 can calculate the optical flow for each of selected pixel regions; the selected pixel regions are included in an area of the current base frame image except for the background areas including the road surface and/or the sky. This eliminates calculation of optical flows in the background areas of the current base frame image, making it possible to reduce the processing load of the ECU 10 required for calculating the optical flows.

The matching unit 150 extracts, from the pixel-region groups of the current base frame image stored in the memory device 10d, at least one pixel-region group including a target object. For example, the matching unit 150 according to the present embodiment extracts, from the pixel-region groups 301 to 305 of the current base frame image stored in the memory device 10d, the pixel-region groups 301 and 302 that are determined to respectively include the first and second target objects 201 and 202.

Then, the matching unit 150 is configured to match a selected number of the optical flows for the respective pixel regions, which are included in the at least one extracted pixel-region group, with the at least one extracted pixel-region group.

That is, the matching unit 150 is configured not to simply match all the optical flows for the respective pixel regions, which are included in the at least one extracted pixel-region group, with the at least one extracted pixel-region group, but to match the selected number of the optical flows for the respective pixel regions, which are included in the at least one extracted pixel-region group, with the at least one extracted pixel-region group. The at least one extracted pixel-region group will also be referred to as at least one target pixel-region group.

The matched number determiner 140, which serves as, for example, adjuster, is configured to determine the selected number of the optical flows, which are included in the at least one extracted pixel-region group, to be matched with the at least one extracted pixel-region group.

The matched number determiner 140 is configured to adjust the selected number of the optical flows, which are included in the at least one extracted pixel-region group, to be matched with the corresponding at least one extracted pixel-region group as a function of the sum of the areas of all the pixel regions included in the at least one extracted pixel-region group.

Specifically, the matched number determiner 140 increases the selected number of the optical flows, which are included in the at least one extracted pixel-region group, to be matched with the corresponding at least one extracted pixel-region group with a decrease in the sum of the areas of all the pixel regions included in the at least one extracted pixel-region group.

For example, if there are k pixel-region groups Gk each including at least one target object, the sum S of the areas of all the pixel regions included in the k pixel-region groups Gk, which will be referred to as target pixel-region groups Gk, can be represented by the following equation (1):

$$S = \Sigma^{k}_{i=1} Si = S1 + S2 + \ldots + Sk \qquad (1)$$

where: Si represents the area of all the pixel regions included in the pixel-region group Gi; and i=1, 2, . . . , k (k is an integer equal to or more than 1)

In addition, the selected number N of optical flows to be associated with the target pixel-region groups Gk can be represented by the following equation (2):

$$N = \Sigma^{k}_{i=1} Ni = N1 + N2 + \ldots + Nk \qquad (2)$$

where Ni represents the selected number of optical flows to be matched with the pixel-region group Gi.

Note that the selected number N of optical flows to be associated with the target pixel-region groups Gk is set to be equal to or less than an upper limit No of the number of optical flows to be matched with the target pixel-region groups Gk; the upper limit No depends on the processing capacity of the matching unit 150, i.e. the ECU 10.

It is preferable that the selected number N of optical flows to be associated with the target pixel-region groups Gk is set to a value as large as possible in view of improvement of the detection ability of the target objects. For this reason, the number N of optical flows to be associated with the target pixel-region groups Gk can be set to the upper limit No if the number of optical flows to be associated with the target pixel-region groups Gk is not excessively large.

That is, if the number of optical flows to be associated with the target pixel-region groups Gk is not excessively large, the number No of optical flows are associated with the target pixel-region groups Gk independently of the size of the sum S of the areas of all the pixel regions included in the target pixel-region groups Gk; the sum S of the areas of all the pixel regions included in the target pixel-region groups Gk will be referred to as a target area summation S.

For this reason, the number of optical flows associated with each unit area of the total area of all the target pixel-region groups Gk increases with a reduction of the target area summation S. In other words, the number of optical flows associated with each of the target pixel-region groups Gk increases with a reduction of the target area summation S.

It is unnecessary to set the selected number N of optical flows to be associated with the target pixel-region groups Gk to the upper limit No as long as the target objects can be detected with sufficiently high accuracy without the number N being set to the upper limit No. If there is a sufficient number of optical flows to be correlated with the total area of the target pixel-region groups Gk, it is possible to detect the target Objects with sufficiently high accuracy while the selected number N of optical flows is set to a value different from the upper limit No.

If it is possible to detect the target objects with sufficiently high accuracy while the selected number N of optical flows is set to a value different from the upper limit No, the matched number determiner 140 can determine the selected number N of optical flows to be associated with the target pixel-region groups Gk such that the selected number N of optical flows increases with an increase of the target area summation S.

For example, the matched number determiner 140 is configured to calculate the selected number N of optical flows to be associated with the target pixel-region groups Gk in accordance with correlation information, such as equation information, map information or table information, CI indicative of correlation between a variable of the selected number N and a variable of the target area summation S; the correlation information CI is stored in the memory device 10$d$. As another example, the matched number determiner 140 is configured to calculate the selected number N of optical flows to be associated with the target pixel-region groups Gk in accordance with a corresponding program in which a functional equation between a variable of the selected number N and a variable of the target area summation S is encoded.

The correlation information or the functional equation between a variable of the selected number N and a variable of the target area summation S can be designed such that the selected number N continuously changes with change of the target area summation S or stepwise changes with change of the target area summation S.

As described above, the matched number determiner 140 enables as many as possible optical flows, which do not exceed the upper limit No, to be matched with the target pixel-region groups Gk. This therefore makes it possible to efficiently utilize the processing capacity of the matching unit 150, i.e. the ECU 10, to thereby detect, which sufficiently high accuracy, the target objects, such as the first target object (vehicle) 201 and the second target object (vehicle) 202, independently of the depth distance of each of the target objects relative to the vehicle V.

Additionally, the matched number determiner 140 determines that the selected number N of optical flows to be associated with the target pixel-region groups Gk is equal to or less than the upper limit No that is previously determined based on the processing capacity of the matching unit 150, i.e. the ECU 10. This prevents the processing load of the matching unit 150, i.e. the ECU 10, which is required to match the optical flows with the target pixel-region groups Gk, from exceeding the processing capacity of the matching unit 150, i.e. the ECU 10.

The matched number determiner 140 can be configured to freely determine the selected number Ni of optical flows to be matched with each pixel-region group Gi insofar as the selected number N of optical flows to be associated with the target pixel-region groups Gk to be equal to or less than the upper limit No. For example, the matched number determiner 140 can be configured to uniformly allocate, for each pixel-region group Gi, the selected number Ni of optical flows to be matched with the corresponding pixel-region group Gi. As another example, the matched number determiner 140 can be configured to change, for each pixel-region group Gi, the selected number Ni of optical flows to be matched with the corresponding pixel-region group Gi depending on the type of the at least one target object in the corresponding pixel-region group Gi and/or the total area of the corresponding pixel-region group Gi.

For example, the matched number determiner 140 can be configured to change, for each pixel-region group Gi, the selected number Ni of optical flows to be matched with the corresponding pixel-region group Gi depending on the area Si of all the pixel regions included in the corresponding pixel-region group Gi. Specifically, the matched number determiner 140 can determine, for each pixel-region group Gi, the selected number Ni of optical flows to be matched with the corresponding pixel-region group Gi in accordance with the following equation (3):

$$Ni=NSi/S \qquad (3)$$

The equation (3) shows that, the larger the area Si of all the pixel regions included in each pixel-region group Gi is, the larger selected number Ni of optical flows to be matched with the corresponding pixel-region group Gi is.

For example, the matched number determiner 140 can determine, for the pixel-region group 301, the selected number N1 of optical flows to be matched with the corresponding pixel-region group 301 in accordance with the following equation (4):

$$N1=NS1/(S1+S2) \qquad (4)$$

where:

S1 represents the area of all the pixel regions included in the pixel-region group 301;

S2 represents the area of all the pixel regions included in the pixel-region group 302; and (S1+S2) represents the target area summation indicative of the sum of the areas of all the pixel regions included in the target pixel-region groups 301 and 302.

Similarly, the matched number determiner 140 can determine, for the pixel-region group 302, the selected number N2 of optical flows to be matched with the corresponding pixel-region group 302 in accordance with the following equation (5):

$$N2=NS2/(S1+S2) \qquad (5)$$

For example, a target object relatively closer to the vehicle V or a relatively larger target object results in the area Si of all the pixel regions included in a pixel-region group Gi including the target object being larger.

For addressing such a case, the matched number determiner 140 is configured to increase the selected number Ni of optical flows to be matched with the pixel-region group Gi with an increase of the area Si of all the pixel regions included in the pixel-region group Gi. This configuration enables the ECU 10 to accurately recognize information about how the target object has moved even if the target object is located to be relatively close to the vehicle V or the target object has a relatively large size.

Let us describes this configuration in more detail.

As described above, the target area summation S of the areas of all the pixel regions included in the target pixel-region groups 301 and 302 can be expressed as S=(S1+S2) based on the equation (1). In addition, the selected number N of optical flows to be associated with the target pixel-region groups 301 and 302 can be expressed as N=(N1+N2) because the selected number of optical flows to be matched with the corresponding pixel-region group 301 is represented as N1, and the selected number of optical flows to be matched with the corresponding pixel-region group 302 is represented as N2.

If the number of optical flows to be associated with the target pixel-region groups 301 and 302 is not excessively large, the matched number determiner 140 can determine the upper limit No as the selected number N of optical flows to be associated with the target pixel-region groups 301 and 302, which is expressed as N=No, thus establishing the equation No=(N1+N2). This results in the number of optical flows per unit area of the total area of the target pixel-region groups 301 and 302, which can be matched with the target pixel-region groups 301 and 302, being expressed as No/(S1+S2).

In addition, determining the selected number N1 of optical flows to be matched with the corresponding pixel-region group 301 in accordance with the equation (3) enables the selected number N1 of optical flows to be matched with the corresponding pixel-region group 301 to be expressed by the following equation (6):

$$N1=NoS1/(S1+S2) \qquad (6)$$

Similarly, determining the selected number N2 of optical flows to be matched with the corresponding pixel-region group 302 in accordance with the equation (3) enables the selected number N2 of optical flows to be matched with the corresponding pixel-region group 302 to be expressed by the following equation (7):

$$N2=NoS2/(S1+S2) \qquad (7)$$

Figure 4:
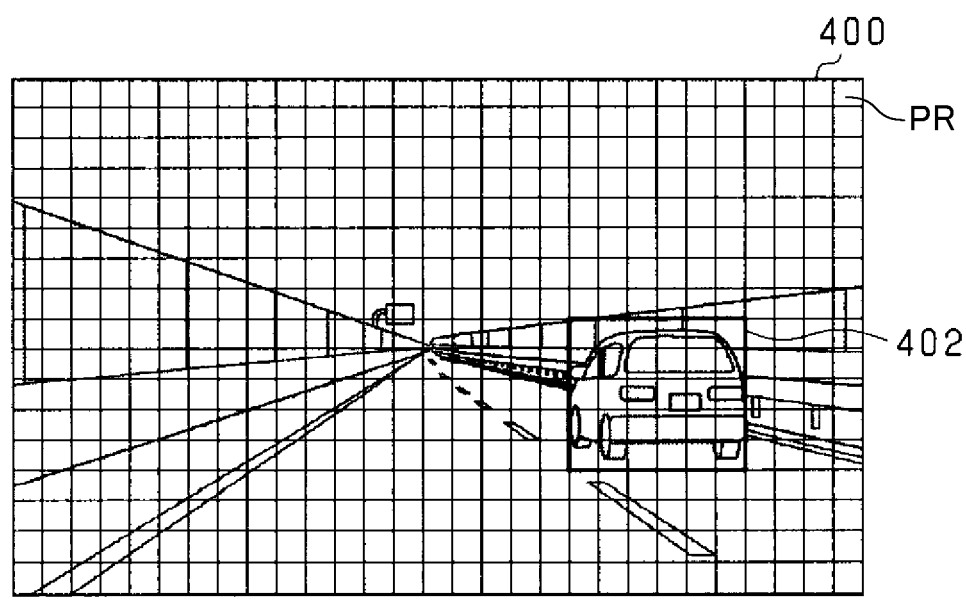
FIG. 4 is a view schematically illustrating another grouped base frame image used to describe another example of how the grouping processor segments selected pixel regions into a pixel-region group including a target object.

In contrast, FIG. 4 schematically illustrates a grouped frame image 400 including a pixel-region group 402; the pixel-region group 402 is recognized as an only one pixel-region group that includes an image of a target object, i.e. a vehicle 202 therein. Note that, in FIG. 4, other pixel-region groups independently of the target object are omitted.

If the area of the pixel regions included in the pixel-region group 402 is identical to the area S2 of the pixel regions included in the pixel-region group 302, the target area summation S is expressed to be S=S2 based on the equation (1).

At that time, if the number of optical flows to be associated with the target pixel-region group 302 is not excessively large, the matched number determiner 140 can determine the upper limit No as the selected number N of optical flows to be associated with the target pixel-region group 302, which is expressed as N=No. This results in the number of optical flows per unit area of the total area of the target pixel-region group 302, which can be matched with the target pixel-region group 302, being expressed as No/S2. This therefore results in the selected number N2 of optical flows to be matched with the corresponding pixel-region group 302 to be expressed by the following equation (8):

$$N2=No \qquad (6)$$

That is, the number of optical flows to be matched with the target pixel-region groups with a small target area summation S of the areas of all the pixel regions included in the target pixel-region groups in the base frame image 400 is set to be larger than the number of optical flows to be matched with the target pixel-region groups with a large target area summation S of the areas of all the pixel regions included in the target pixel-region groups in the base frame image 300.

For example, the matched number determiner 140 can be configured to change the selected number of optical flows, which are to be matched with a first pixel-region group including a vehicle as its target object, to be larger than the selected number of optical flows, which are to be matched with a second pixel-region group including a road traffic sign as its target object even if the area of the first pixel-region group is identical to the area of the second pixel-region group.

As another example, the matched number determiner 140 can be configured to change the selected number of optical flows, which are to be matched with a first pixel-region group including a first target object with a first average depth distance, to be larger than the selected number of optical flows, which are to be matched with a second pixel-region group including a second target object with a second average depth distance larger than the first average depth distance, even if the area of the first pixel-region group is identical to the area of the second pixel-region group.

For example, if an average depth distance of a target object included in a target pixel-region group Gm belonging to the target pixel-region groups Gk is smaller than an average depth distance of another target object included in another pixel-region group belonging to the target pixel-region groups Gk, the matched number determiner 140 can replace an area Sm that represents the area of all the pixel regions included in the target pixel-region group Gm with a corrected area Sm1 in accordance with the following equation (9):

$$Sm1 = a \times Sm \qquad (9)$$

where reference character a represents a weight correction coefficient set to be larger than 1.

As described above, the matching unit 150 extracts, from the pixel-region groups of the current base frame image stored in the memory device 10d, at least one target pixel-region group including a target object. Then, the matching unit 150 is configured to match the selected number of the optical flows, which is determined by the matched number determiner 140, included in the at least one target pixel-region group with the at least one target pixel-region group.

Figure 5:
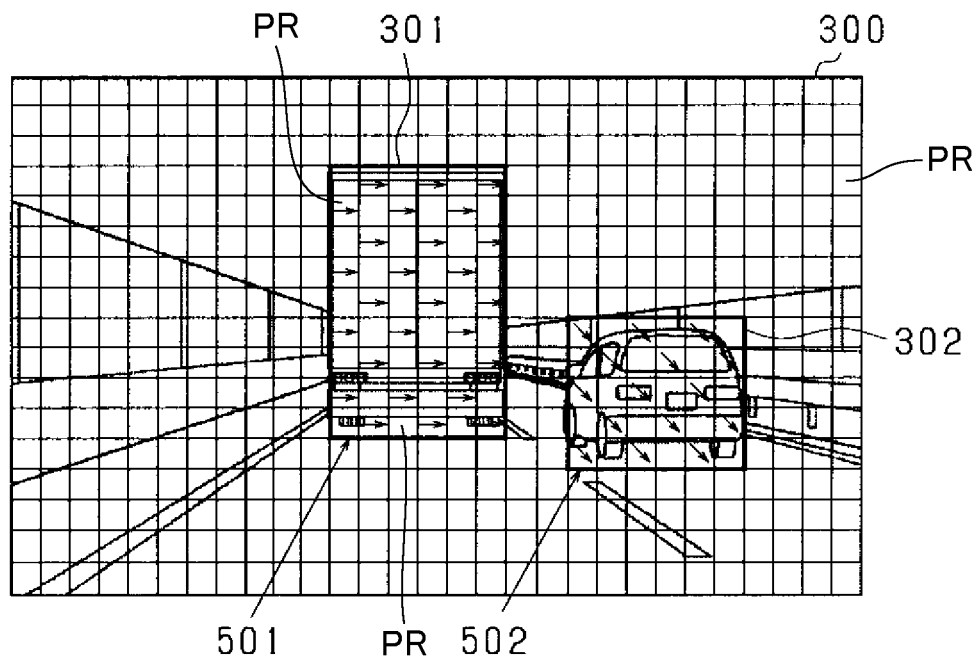
FIG. 5 is a view schematically illustrating the base frame image illustrated in FIG. 3 in which optical flows are matched with a corresponding one of the pixel region groups.

FIG. 5 schematically illustrates an example of the base frame image 300 in which optical flows 501 are matched with the target pixel-region group 301 and optical flows 502 are matched with the target pixel-region group 302. Similarly, FIG. 6 schematically illustrates an example of the base frame image 400 in which optical flows 602 are matched with the target pixel-region group 402.

Figure 6:
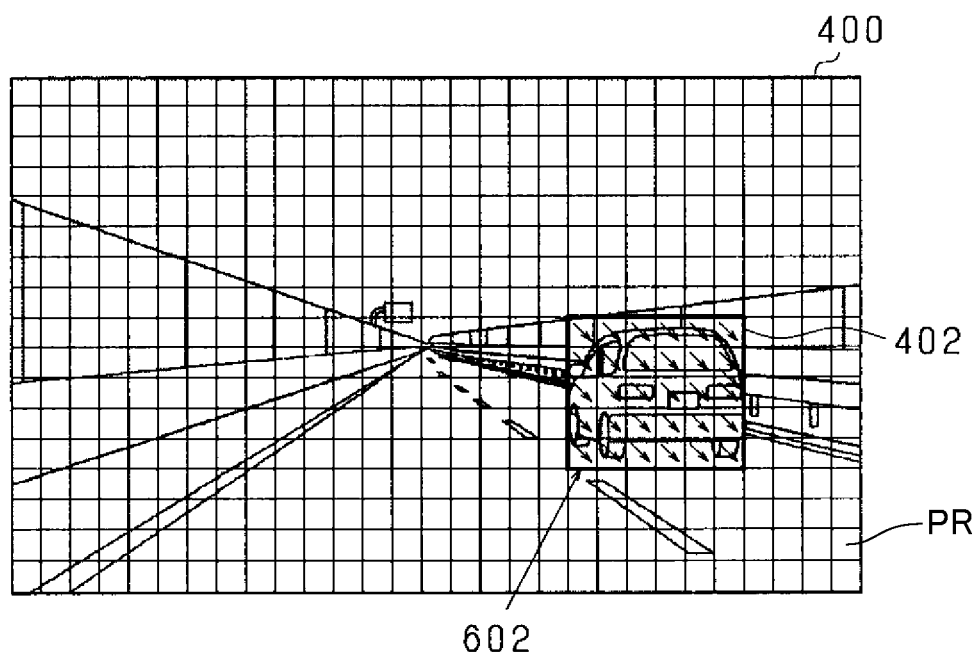
FIG. 6 is a view schematically illustrating the base frame image illustrated in FIG. 4 in which optical flows are matched with the corresponding pixel region group.

As illustrated in each of FIGS. 5 and 6, each of the optical flows 501, 502, and 602 is plotted as an arrow. That is, the number of optical flows 501, the number of optical flows 502, and the number of optical flows 602 are respectively illustrated as the number of arrows 501, the number of arrows 502, and the number of arrows 602.

FIGS. 5 and 6 show that the number of optical flows 602 is larger than each of the number of optical flows 501 and the number of optical flows 502. That is, the number of optical flows per unit area of the total area of the target pixel-region group 402 is also larger than each of the number of optical flows per unit area of the total area of the target pixel-region group 301 and the number of optical flows per unit area of the total area of the target pixel-region group 302.

In FIGS. 5 and 6, the total number of optical flows 501 and 502 in the target pixel-region groups 301 and 302 is set to be larger than the number of optical flows 602, but the total number of optical flows 501 and 502 in the target pixel-region groups 301 and 302 and the number of optical flows 602 can be equally set to the upper limit No.

FIG. 5 also shows that the number of optical flows 501 matched with the target pixel-region group 301 is larger than the number of optical flows 502 matched with the target pixel-region group 302, because the area of the target pixel-region group 301 is larger than the area of the target pixel-region group 302. In other words, the number of optical flows matched with a corresponding target pixel-region group is determined such that the larger the area of the target pixel-region group is, the larger the number of optical flows matched with the target pixel-region group.

The movement state detector 160 is configured to detect, based on the selected number of the optical flows matched with the at least one target pixel-region group, how at least one target object, which is located around the vehicle V, corresponding to the at least one target pixel-region group has been moving.

For example, the movement state detector 160 recognizes, as at least one target object located around the vehicle V, the at least one target pixel-region group with each of which the selected number of the optical flows are matched. Then, the movement state detector 160 obtains movement state information about how the at least one target pixel-region group has been moving based on the optical flows matched with the at least one target pixel-region group.

For example, the movement state detector 160 calculates, based on the optical flows matched with the at least one target pixel-region group, a relative speed of the at least one target pixel-region group relative to the vehicle V in a three-dimensional coordinate system as a first parameter of the movement state information. Note that the three-dimensional coordinate system is defined based on, for example, a two-dimensional coordinate space, i.e. an X-Y coordinate space, including the baseline BL and being perpendicular to the travelling direction of the vehicle V, and a Z axis perpendicular to the two-dimensional coordinate space and passing through the center of the baseline BL.

The movement state detector 160 can calculate, based on the optical flows matched with the at least one target pixel-region group, an absolute speed of the at least one target pixel-region group, i.e. the at least one target object, as a second parameter of the movement state information. The movement state detector 160 can also calculate, based on the optical flows matched with the at least one target pixel-region group, acceleration or deceleration of the at least one target pixel-region group, i.e. the at least one target object, as a third parameter of the movement state information.

The movement state detector 160 is configured to store the optical flows matched with the at least one target pixel-region group in the memory device 10d.

Additionally, the movement state detector 160 determines whether there is a possibility of the at least one target object affecting the travelling of the vehicle V in accordance with the movement state information about the at least one target object, and outputs, based on the determination result, control instructions to the cruise assist devices 30.

The cruise assist devices 30 include, for example, a warning device 31, a display device 32, and cruise control devices 33.

The warning device 31 includes, for example, a speaker mounted in the compartment of the vehicle V. The warning device 31 is configured to output warnings including, for example, warning sounds to inform the driver of the presence of the at least one target object in response to a control instruction sent from the ECU 10 when the ECU 10 determines that there is a probability of collision of the vehicle V with the at least one target object based on the determination result.

The display device 32 is mounted in the compartment of the vehicle V. The display device 32 is configured to output warning messages to inform the driver of the presence of the at least one target object in response to a control instruction sent from the ECU 10 when the ECU 10 determines that there is a high probability of collision of the vehicle V with the at least one target object based on the determination result.

The cruise control devices 33 include a brake device configured to brake the vehicle V. The brake device is activated in response to a control instruction sent from the ECU 10 when the ECU 10 determines that there is a high probability of collision of the vehicle V with the at least one target object based on the determination result. Specifically, the brake device performs a brake-assist function of increasing braking force, which is based on the driver's brake operation, to the vehicle V, or an automatic brake function of automatically braking the vehicle V if there is no braking operation by the driver.

The cruise control devices 33 also include a steering device configured to control the travelling course of the vehicle V. The steering device is activated in response to a control instruction sent from the ECU 10 when the ECU 10 determines that there is a high probability of collision of the vehicle V with the at least one target object based on the determination result. Specifically, the steering device performs a steering assist function of assisting a driver's steering operation of the steering wheel of the vehicle V, or an automatic steering function of automatically steering the vehicle V if there is no steering operation by the driver.

Next, the following describes a target object detection routine that constitutes a surround view monitoring routine carried out by the ECU 10 of the surround view monitoring apparatus 10 with reference to FIG. 7. The CPU 10c of the ECU 10 can be programmed to execute at least one program stored in the memory device 10d to thereby execute the target object detection routine every predetermined period. Hereinafter, one target object detection routine periodically performed by the CPU 10c will be referred to as a cycle.

Upon starting a current cycle of the target object detection routine, the CPU 10c serves as, for example, the distance information obtainer 110 to execute an image obtaining step that obtains, from the distance image sensor apparatus 20, a pair of first and second frame images, i.e. first and second frame image data items, of a common target scene from the different positions such that the first frame image synchronized with the second frame image in step S101.

Next, the CPU 10c serves as, for example, the distance information obtainer 110 to execute a distance information obtaining step that obtains, for each pixel region of, for example, a selected one of the first and second frame images as a current base frame image in the current cycle, the corresponding depth distance information item and the corresponding luminance information item in step S102. Then, the CPU 10c serves as, for example, the distance information obtainer 110 to store the depth distance information item and the luminance information item for each pixel region of the base frame image in the memory device 10d in step S102.

As described above, the CPU 10c executes target object detection routine every predetermined period. For this reason, if the CPU 10c has executed the target object detection routine K cycles (K is an integer equal to or more than 2), the first set of the depth distance information item and the luminance information item for each pixel region of the base frame image in the first cycle, . . . , and the K-th set of the depth distance information item and the luminance information item for each pixel region of the base frame image in the K-th cycle have been stored in the memory device 10d.

For example, the CPU 10c serves as the distance information obtainer 110 to (1) Generate a disparity map, i.e. a disparity image, comprised of the disparities of all the pixel regions in the base frame image (2) Store, in the memory device 10d, the disparity of each pixel region in the disparity image as the depth distance information item for the corresponding pixel region as the depth distance information item for the corresponding pixel region As another example, the CPU 10c serves as the distance information obtainer 110 to (1) Calculate a depth distance for each pixel region in the disparity image based on the disparity of the corresponding pixel region in the disparity image (2) Store the calculated depth distance for each pixel region as the depth distance information item for the corresponding pixel region in the disparity image Next, the CPU 10c serves as, for example, the grouping processor 120 to execute a grouping step that segments the pixel regions in the base frame image into one or more plural pixel-region groups in accordance with the depth distance information items for the respective pixel regions in step S103.

For example, the CPU 10c serves as the grouping processor 120 to segment pixel regions into the same pixel-region group upon determining that the pixel regions are three-dimensionally close to each other in accordance with their depth distance information items.

That is, it is assumed that the target scene imaged as the base frame image 200 comprised of the pixel regions PR includes vehicles 201 and 202 and guard rails 204 as solid objects, and also includes the sky 203 above the vehicles 201 and 202, and the road surface 205 on which the vehicle V is travelling as backgrounds.

In this assumption, the CPU 10c partitions the base frame image 200 into the pixel regions PR, and obtains, from each of the pixel regions PR, the corresponding luminance information item and the corresponding depth distance information item.

Then, the CPU 10c segments the pixel regions PR into five pixel-region groups 301 to 305 (see FIG. 3) in accordance with the depth distance information items of the pixel regions PR such that segmented pixel regions PR included in each of the pixel-region groups 301 to 305 are (1) Adjacent to each other in the vertical column direction or the horizontal row direction of the base frame image 200

(2) The depth distances of the segmented pixel regions PR in the vertical column direction or the horizontal row direction are substantially identical to each other or the absolute differences between the depth distances of the segmented pixel regions PR are within a predetermined range (see FIG. 3)

That is, as illustrated in FIG. 3, the pixel-region groups 301, 302, 303, 304, and 350 respectively correspond to the image of the vehicle 201, the image of the vehicle 202, the image of the sky 203, the image of the guard rails 204, and the image of the road surface 205.

Next, the CPU 10c serves as, for example, the grouping processor 120 to execute a target-object reliability determining step that determines a target-object reliability indicative of whether each of the pixel-region groups shows at least one solid object in step S104.

For example, the CPU 10c determines, for each of the pixel-region groups, the target-object reliability in accordance with the depth distance information items for the corresponding pixel-region group in step S104. Note that, in the present embodiment, the CPU 10c recognizes at least one solid object as at least one target object to be monitored.

Specifically, it is assumed that the pixel-region groups 301, 302, 303, 304, and 350 are established in step S103 (see FIG. 3). At that time, the CPU 10c determines, for each of the pixel-region groups 301 to 305, the target-object reliability in accordance with (1) The depth distance for each pixel region included in the corresponding pixel-region group (2) How the depth distances for the pixel regions included in the corresponding pixel-region group are changed in the corresponding pixel-region group For example, the CPU 10c determines that the target-object reliability of the pixel-region group 301 is higher than a predetermined threshold reliability upon determining that (1) The maximum depth distance or the average depth distance included in the pixel-region group 301 is smaller than a predetermined threshold distance (2) The average of change quantities between the depth distances of each adjacent pixel-region pair included in the pixel-region group 301 is smaller than a predetermined threshold amount of change Similarly, the CPU 10c determines that the target-object reliability of the pixel-region group 302 is higher than the predetermined threshold reliability upon determining that (1) The maximum depth distance or the average depth distance included in the pixel-region group 302 is smaller than the predetermined threshold distance (2) The average of change quantities between the depth distances of each adjacent pixel-region pair included in the pixel-region group 302 is smaller than the predetermined threshold amount of change This is because, in a front-view image, the depth distances of respective most points on the rear surface of a preceding vehicle in front of the vehicle V are relatively small and similar to each other.

In contrast, the CPU 10c determines that the target-object reliability of the pixel-region group 303 is lower than the predetermined threshold reliability upon determining that (1) The maximum depth distance or the average depth distance included in the pixel-region group 303 is larger than the predetermined threshold distance (2) The average of change quantities between the depth distances of each adjacent pixel-region pair included in the pixel-region group 303 is smaller than the predetermined threshold amount of change This is because, in a front-view image, the depth distances of respective most points on the sky are similar to each other, but are relatively large.

Additionally, the CPU 10c determines that the target-object reliability of the pixel-region group 305 is lower than the predetermined threshold reliability upon determining that (1) The maximum depth distance or the average depth distance included in the pixel-region group 305 is smaller than the predetermined threshold distance (2) The average of change quantities between the depth distances of each adjacent pixel-region pair included in the pixel-region group 305 is larger than the predetermined threshold amount of change This is because, in a front-view image, the depth distances of respective most points on a road surface are relatively small, but the depth distance at any upper point on the road surface is smaller than the depth distance at any lower point on the road surface.

Similarly, the CPU 10c determines that the target-object reliability of the pixel-region group 304 is lower than the predetermined threshold reliability upon determining that (1) The maximum depth distance included in the pixel-region group 304 is smaller than the predetermined threshold distance (2) The average of change quantities between the depth distances of each adjacent pixel-region pair included in the pixel-region group 304 is larger than the predetermined threshold amount of change This is because, in a front-view image, the maximum depth distance of a closest point on a guardrail to the vehicle V is smaller than the depth distance at any lower point on the road surface, but the depth distance at a closest end on the guard rail to the vehicle V is smaller than the depth distance at a farthest point on the guard rail from the vehicle V.

That is, in step S104, the CPU 10c determines that the target-object reliability of each of the pixel-region groups 301 and 302 is higher than the predetermined threshold reliability, thus determining that each of the pixel-region groups 301 and 302 shows a solid object, i.e. a target object; the pixel-region groups 301 and 302 each showing a corresponding target object will also be referred to as target pixel-region groups 301 and 302.

Note that, the CPU 10c can determine, for each of the pixel-region groups, the target-object reliability in accordance with the disparities for the corresponding pixel-region group in step S104, because the depth distance of any pixel region in a selected pixel-region group is inversely proportional to the disparity of the corresponding pixel region.

Following the operation in step S104, the CPU 10c serves as, for example, the movement information obtainer 130 to execute a movement information obtaining step that calculates, between the current base frame image and the immediately previous frame image immediately previous to the current base frame image, an optical flow for each of the pixel regions in the current base frame image in step S105; the optical flow for each of the pixel regions in the current base frame image includes the direction and amount of movement of a corresponding part of the target object from the immediately previous frame image to the current base frame image.

For example, the movement information obtainer 130 calculates the optical flow for each of the pixel regions in the current base frame image relative to the corresponding one of the pixel regions in the immediately previous frame image as a movement information item of the corresponding part of the target object.

Next, the CPU 10c serves as, for example, the matched number determiner 140 to execute a matched number determining step that determines a selected number of the optical flows included in each of the target pixel-region groups 301 and 302 to be matched with the corresponding one of the target pixel-region groups 301 and 302 in step S106.

For example, in step S106a, the CPU 10c calculates the sum of the areas of all the pixel regions in the target pixel-region groups 301 and 302.

Then, in step S106b, the CPU 10c adjusts the selected number of the optical flows included in each of the target pixel-region groups 301 and 302 to be matched with the corresponding one of the target pixel-region groups 301 and 302 as a function of the sum of the areas of all the pixel regions included in the target pixel-region groups 301 and 302.

For example, in step S106b1, the CPU 10c increases the selected number of the optical flows included in each of the target pixel-region groups 301 and 302 to be matched with the corresponding one of the target pixel-region groups 301 and 302 with a decrease in the sum of the areas of all the pixel regions included in the target pixel-region groups 301 and 302.

In addition, the target pixel-region groups 301 and 302 are included in the current base frame image. For this reason, in step S10b2, the CPU 10c determines the selected number of the optical flows included in each of the target pixel-region groups 301 and 302 to be matched with the corresponding one of the pixel-region groups 301 and 302 such that, the larger the area of all the pixel regions in each of the target pixel-region groups 301 and 302 is, the larger the selected number of the optical flows included in the corresponding one of the target pixel-region groups 301 and 302 to be matched with the corresponding one of the target pixel-region groups 301 and 302 is.

In other words, in step S106c, the CPU 10c determines the selected number of the optical flows included in each of the target pixel-region groups 301 and 302 to be matched with the corresponding one of the pixel-region groups 301 and 302 such that, if the area of all the pixel regions in one of the target pixel-region groups 301 and 302 is larger than the area of all the pixel regions in the other thereof, the selected number of the optical flows included in one of the target pixel-region group 301 and 302 to be matched with the corresponding one of the pixel-region groups 301 and 302 is larger than the selected number of the optical flows included in the other of the target pixel-region group 301 and 302 to be matched with the other of the target pixel-region groups 301 and 302.

Note that, in step S106, the CPU 10c determines the selected number of the optical flows included in each of the target pixel-region groups 301 and 302 to be matched with the corresponding one of the pixel-region groups 301 and 302 as long as the total number of the optical flows to be associated with the target pixel-region groups 301 and 302 is equal to or smaller than the upper limit depending on the processing capacity of the matching unit 150, i.e. the ECU 10.

Following the operation in step S106, the CPU 10c serves as, for example, the matching unit 150 to execute a matching step that matches the selected number of the optical flows for each of the target pixel-region groups 301 and 302 with the corresponding one of the target pixel-region groups 301 and 302 in step S107. Note that the CPU 10c can match the selected number of the optical flows for each of all the pixel-region groups included in the current base frame image with the corresponding one of all the pixel-region groups.

Next, the CPU 10c serves as, for example, the movement state detector 160 to execute a movement state detecting step that detects, based on the selected number of the optical flows matched with each of the target pixel-region groups 301 and 302, how the target object, which is located around the vehicle V, corresponding to each of the target pixel-region groups 301 and 302 has been moving in step S108.

Specifically, the CPU 10c recognizes each of the target pixel-region groups 301 and 302 with each of which the selected number of the optical flows are matched. Then, the movement state detector 160 obtains movement state information about how each of the target pixel-region groups 301 and 302 has been moving based on the optical flows matched with the corresponding one of the target pixel-region groups 301 and 302.

For example, the CPU 10c calculates, based on the optical flows matched with each of the target pixel-region groups 301 and 302, the relative speed of the corresponding one of the target pixel-region groups 301 and 302 relative to the vehicle V in the three-dimensional coordinate system as the first parameter of the movement state information.

The CPU 10c can calculate, based on the optical flows matched with each of the target pixel-region groups 301 and 302, the absolute speed of the corresponding one of the target pixel-region groups 301 and 302 as the second parameter of the movement state information. The CPU 10c can also calculate, based on the optical flows matched with each of the target pixel-region groups 301 and 302, acceleration or deceleration of the corresponding one of the target pixel-region groups as the third parameter of the movement state information.

In step S108, the CPU 10c stores the optical flows matched with each of the target pixel-region groups 301 and 302 in the current base frame image in the memory device 10d; the optical flows matched with each of the target pixel-region groups 301 and 302 in the current base frame image and stored in the memory device 10d are used for, for example, the operation in step S105 in the next cycle.

Following the operation in step S108, the CPU 10c serves as, for example, the movement state detector 160 to execute a collision possibility determination task that (1) Determine whether there is a possibility of each of the target objects, i.e. each of the target pixel-region groups 301 and 302, affecting the travelling of the vehicle V in accordance with the movement state information about the corresponding one of the target pixel-region groups 301 and 302

(2) Output, based on the determination result, control instructions to the cruise assist devices 30

As described above, the warning device 31 outputs warnings including, for example, warning sounds to inform the driver of the presence of at least one of the target objects in response to a control instruction sent from the ECU 10 when the ECU 10 determines that there is a probability of collision of the vehicle V with at least one of the target objects based on the determination result.

The display device 32 outputs warning messages to inform the driver of the presence of at least one of the target objects in response to a control instruction sent from the ECU 10 when the ECU 10 determines that there is a high probability of collision of the vehicle V with at least one of the target objects based on the determination result.

The brake device of the cruise control devices 33 is activated to perform the brake-assist function or automatic brake function in response to a control instruction sent from the ECU 10 when the ECU 10 determines that there is a high probability of collision of the vehicle V with at least one of the target objects based on the determination result.

The steering device of the cruise control devices 33 controls the travelling course of the vehicle V. The steering device is activated to perform the steering assist function and the automatic steering function in response to a control instruction sent from the ECU 10 when the ECU 10 determines that there is a high probability of collision of the vehicle V with at least one of the target objects based on the determination result.

Note that the sequential execution order of the operations in steps S101 to S109 can be changed as long as the subject matter of the target object detection routine can be implemented. Similarly, at least part of the operations in steps S101 to S109 can be omitted as long as the subject matter of the target object detection routine can be implemented.

As described above, the surround view monitoring apparatus 10 according to the present embodiment is configured to determine a selected number Ni of optical flows, which are included in at least one target pixel-region group, to be matched with the at least one target pixel-region group such that, the smaller the sum S of the areas of all the pixel regions included in the at least one target pixel-region group is, the larger the selected number Ni of the optical flows, which are included in the corresponding at least one target pixel-region group, to be matched with the corresponding at least one extracted pixel-region group is.

That is, the processing capacity of the matching unit 150, i.e. the ECU 10, depends on the sum of the areas of all the pixel regions included in the at least one target pixel-region group. That is, if the sum of the areas of all the pixel regions included in the at least one target pixel-region group is relatively small, the surround view monitoring apparatus 10 makes it possible to increase the selected number of the optical flows included in the corresponding at least one target pixel-region group to be matched with the corresponding at least one target pixel-region group.

This configuration therefore prevents the number of optical flows included in each of pixel-region groups, whose average depth distances are relatively small, to be matched with the corresponding one of the pixel-region groups from decreasing although the matching unit 150, i.e. the CPU 10c, has a sufficient processing capacity to perform the matching. This therefore prevents the detection accuracy of target objects from being reduced.

The surround view monitoring apparatus 10 is configured to allocate the total number N of optical flows to be matched with the target pixel-region groups such that, the larger the area Si of all the pixel regions included in each target pixel-region group Gi is, the smaller the selected number Ni of optical flows to be matched with the corresponding pixel-region group Gi.

This configuration enables optical flows to be matched with each of the target pixel-region groups as much as possible while preventing an increase of the total processing load of the matching unit 150, i.e. the ECU 10.

The surround view monitoring apparatus 10 according to the present embodiment is configured not to include the distance image sensor apparatus 20 and the cruise assist devices 30, but can be configured to include the distance image sensor apparatus 20 and/or the cruise assist devices 30.

The functions of one element in the present embodiment can be distributed as plural elements, and the functions that plural elements have can be combined into one element. At least part of the structure of the present embodiment can be replaced with a known structure having the same function as the at least part of the structure of the present embodiment. A part of the structure of the present embodiment can be eliminated. All aspects included in the technological ideas specified by the language employed by the claims constitute embodiments of the present disclosure.

The present disclosure can be implemented by various embodiments; the various embodiments include systems each including the surround view monitoring apparatus 10, programs for serving a computer as the surround view monitoring apparatus 10, storage media, such as non-transitory computer readable media, storing the programs, and surround view monitoring methods.

While the illustrative embodiment of the present disclosure has been described herein, the present disclosure is not limited to the embodiment described herein, but includes any and all embodiments having modifications, omissions, combinations (e.g., of aspects across various embodiments), adaptations and/or alternations as would be appreciated by those having ordinary skill in the art based on the present disclosure. The limitations in the claims are to be interpreted broadly based on the language employed in the claims and not limited to examples described in the present specification or during the prosecution of the application, which examples are to be construed as non-exclusive.

What is claimed is:

1. An apparatus for monitoring a region around a vehicle based on an image captured around the vehicle, the image being comprised of a plurality of pixel regions, the apparatus comprising:
    a distance information item obtainer configured to obtain, for each of the pixel regions of the image, a distance information item relative to the vehicle in accordance with the image;
    a grouping processor configured to segment the pixel regions of the image into at least one pixel region group, the at least one pixel region group including at least one target object;
    an optical flow calculator configured to calculate an optical flow for each of selected pixel regions included in the at least one pixel region group of the image, the optical flow for each of the selected pixel regions including information about a direction and amount of movement of a corresponding part of the at least one target object;
    an adjuster configured to:
        calculate a sum of areas of all the pixel regions included in the at least one pixel region group of the image; and
        adjust a selected number of optical flows to be matched with the at least one pixel region group as a function of the sum of the areas of all the pixel regions included in the at least one pixel region group; and
    a movement state detector configured to detect how the at least one target object has been moving based on the selected number of the optical flows matched with the at least one pixel region group.

2. The apparatus according to claim 1, wherein:
    the adjuster is configured to increase the selected number of the optical flows to be matched with the at least one pixel region group with a decrease in the sum of the areas of all the pixel regions included in the at least one pixel region group.

3. The apparatus according to claim 1, wherein:
    the at least one target object comprises a first target object and a second target object;
    the grouping processor is configured to segment the pixel regions of the image into at least first and second pixel region groups, each of the first and second pixel region groups including a corresponding one of the first and second target objects; and
    the adjuster is configured to:
        calculate a sum of the areas of all the pixel regions included in each of the first and second pixel region groups; and
        determine whether the sum of the areas of all the pixel regions included in the first pixel region group is larger than the sum of the areas of all the pixel regions included in the second pixel region group; and
        make larger the selected number of the optical flows to be matched with the first pixel region group as compared with the selected number of the optical flows to be matched with the second pixel region group upon determining that the sum of the areas of all the pixel regions included in the first pixel region group is larger than the sum of the areas of all the pixel regions included in the second pixel region group.

4. The apparatus according to claim 1, wherein:
the at least one target object comprises a first target object and a second target object;
the grouping processor is configured to segment the pixel regions of the image into at least first and second pixel region groups, each of the first and second pixel region groups including a corresponding one of the first and second target objects, an upper limit of optical flows to be matched with at least the first and second pixel region groups being determined; and
the adjuster is configured to:
calculate a first area of all the pixel regions included in the first pixel region group of the image;
calculate a second area of all the pixel regions included in the second pixel region group of the image; and
adjust the selected number of the optical flows to be matched with the first pixel region group and the selected number of the optical flows to be matched with the second pixel region group in accordance with the first area and the second area as long as a total number of the optical flows to be matched with the first and second pixel region groups is equal to or smaller than the upper limit.

5. The apparatus according to claim 1, wherein:
the image is one of a first image and a second image of the at least one target object synchronously captured from respective different points, one of the first and second images being a base image, the other of the first image and the second image being a reference image;
each point of the at least one target object is projected to a pair of matched pixel regions in a respective base image and reference image; and
the distance information item obtainer is configured to obtain a disparity of each of the matched pixel regions of the base image relative to a corresponding matched pixel region of the reference image as a function of the distance information item for a corresponding one of the matched pixel regions of the base image.

6. A method of monitoring a region around a vehicle based on an image captured around the vehicle, the image being comprised of a plurality of pixel regions, the method comprising:
obtaining, for each of the pixel regions of the image, a distance information item relative to the vehicle in accordance with the image;
segmenting the pixel regions of the image into at least one pixel region group, the at least one pixel region group including at least one target object;
calculating an optical flow for each of selected pixel regions included in the at least one pixel region group of the image in accordance with change between a previous image and the image, the optical flow for each of the selected pixel regions including information about a direction and amount of movement of a corresponding part of the at least one target object;
calculating a sum of areas of all the pixel regions included in the at least one pixel region group of the image;
adjusting a selected number of optical flows to be matched with the at least one pixel region group as a function of the sum of the areas of all the pixel regions included in the at least one pixel region group; and
detecting how the at least one target object has been moving based on the selected number of the optical flows matched with the at least one pixel region group.

7. The method according to claim 6, wherein:
adjusting the selected number of the optical flows includes:
increasing the selected number of the optical flows to be matched with the at least one pixel region group with a decrease in the sum of the areas of all the pixel regions included in the at least one pixel region group.

8. An apparatus for monitoring a region around a vehicle based on an image captured around the vehicle, the image being comprised of a plurality of pixel regions, the apparatus comprising:
a processor;
a non-transitory computer readable storage medium; and
a set of computer-executable instructions stored on the non-transitory computer-readable storage medium that cause the processor to implement:
obtaining, for each of the pixel regions of the image, a distance information item relative to the vehicle in accordance with the image;
segmenting the pixel regions of the image into at least one pixel region group, the at least one pixel region group including at least one target object;
calculating an optical flow for each of selected pixel regions included in the at least one pixel region group of the image, the optical flow for each of the selected pixel regions including information about a direction and amount of movement of a corresponding part of the at least one target object;
calculating a sum of areas of all the pixel regions included in the at least one pixel region group of the image;
adjusting a selected number of optical flows to be matched with the at least one pixel region group as a function of the sum of the areas of all the pixel regions included in the at least one pixel region group; and
detecting how the at least one target object has been moving based on the selected number of the optical flows matched with the at least one pixel region group.

9. The apparatus according to claim 8, wherein:
the adjusting includes:
increasing the selected number of the optical flows to be matched with the at least one pixel region group with a decrease in the sum of the areas of all the pixel regions included in the at least one pixel region group.

* * * * *